Feb. 27, 1940.                    E. HOLM                    2,191,529
                              WEIGHING APPARATUS
                            Filed Aug. 23, 1938              3 Sheets-Sheet 1

INVENTOR,
Einar Holm,
BY John␣␣␣␣␣␣␣␣
ATTORNEY.

INVENTOR,
Einar Holm,
BY John W. Steward
ATTORNEY.

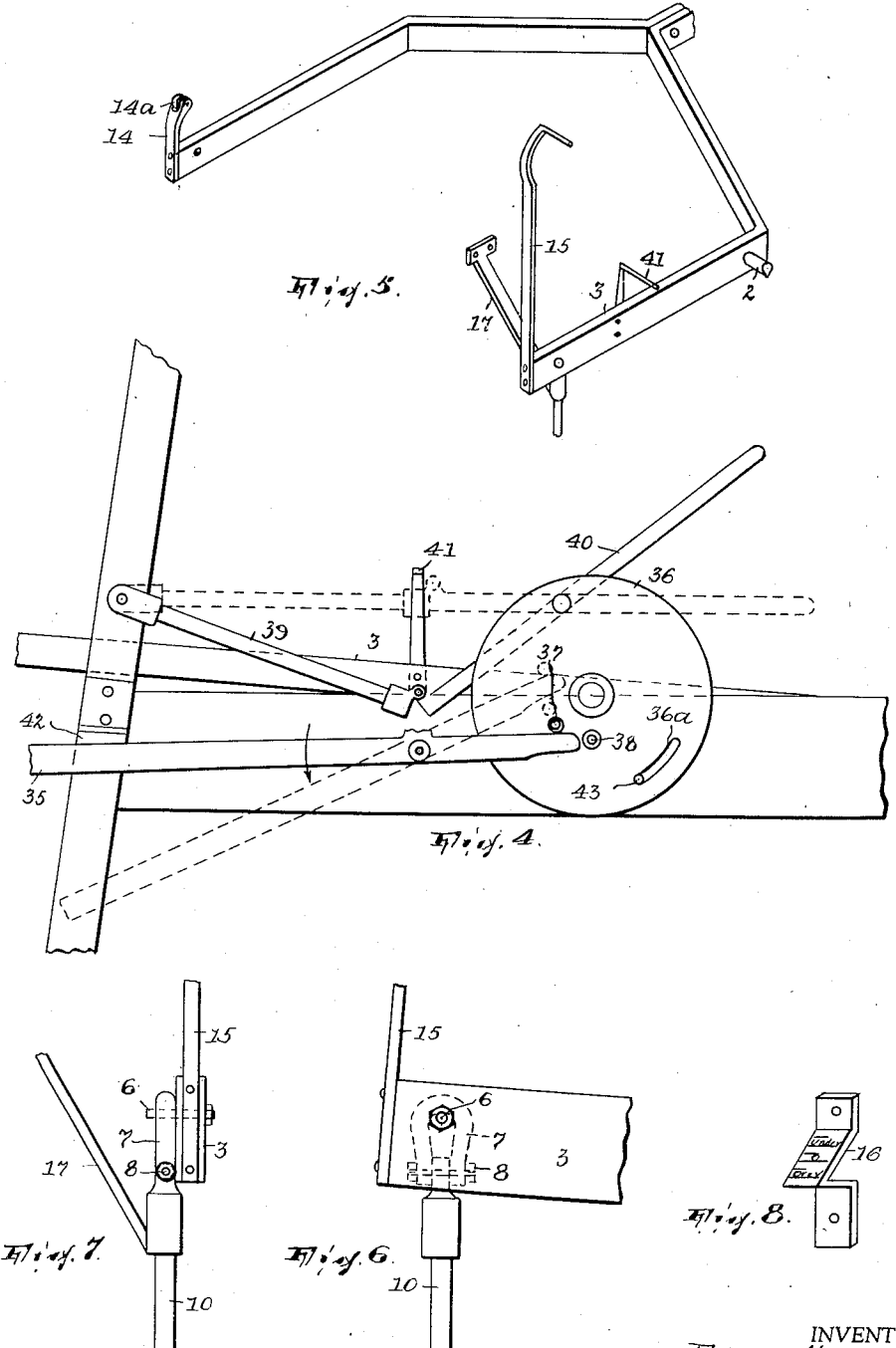

Patented Feb. 27, 1940

2,191,529

UNITED STATES PATENT OFFICE 2,191,529

WEIGHING APPARATUS

Einar Holm, Passaic, N. J.

Application August 23, 1938, Serial No. 226,213

13 Claims. (Cl. 249—2)

This invention relates to weighing apparatus and it has reference particularly to apparatus for weighing solid materials in divided form, such as certain small sizes of coal, for example.

The invention contemplates the use, with a balance, of a movable hopper which is to discharge on to the platform of the balance and a constantly going vibrator for such hopper, the hopper being supported in the frame of the machine so as to be movable into or out of the range of movement of the vibrator, and when it is within said range being yieldingly held engaged with the vibrator. Manually operated means determines the position of the hopper in or out of said range; in the example hereinafter set forth, the hopper is normally urged out of said range and said means is used to move it thereinto, said means providing a spring which at that time yieldingly holds the hopper engaged with the vibrator.

The invention also contemplates means to hold or lock the first-named means in the position in which the hopper undergoes vibration, which means may be caused to cease its holding action either by movement of the balance in response to the load deposited on its platform or manually.

In the drawings,

Fig. 4 is a fragmentary right side elevation on a larger scale showing by solid and dotted lines certain movable parts in two different positions;

Fig. 5 is an isometric view of the main weighing beam and some of the parts associated therewith;

Fig. 6 is a fragmentary side elevation of said weighing beam and parts associated therewith;

Fig. 7 is a front elevation of what is shown by Fig. 6;

Fig. 8 is an isometric view of a certain scale-bearing strip; and

Fig. 9 shows in side elevation the vibrator and the means for reciprocating or vibrating the same.

Figure 1:
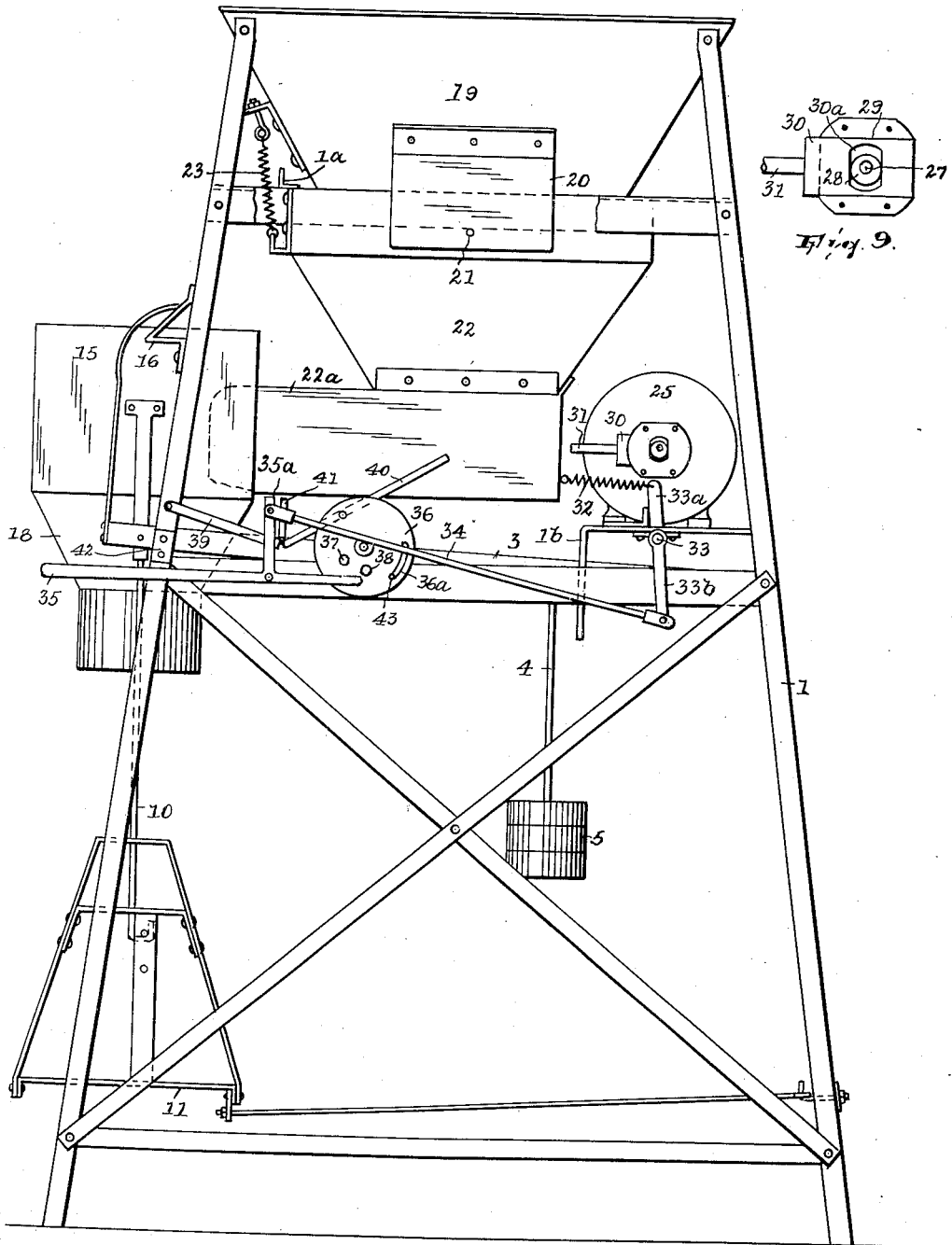
Fig. 1 is a right side elevation of weighing apparatus embodying the invention.
Figure 2:
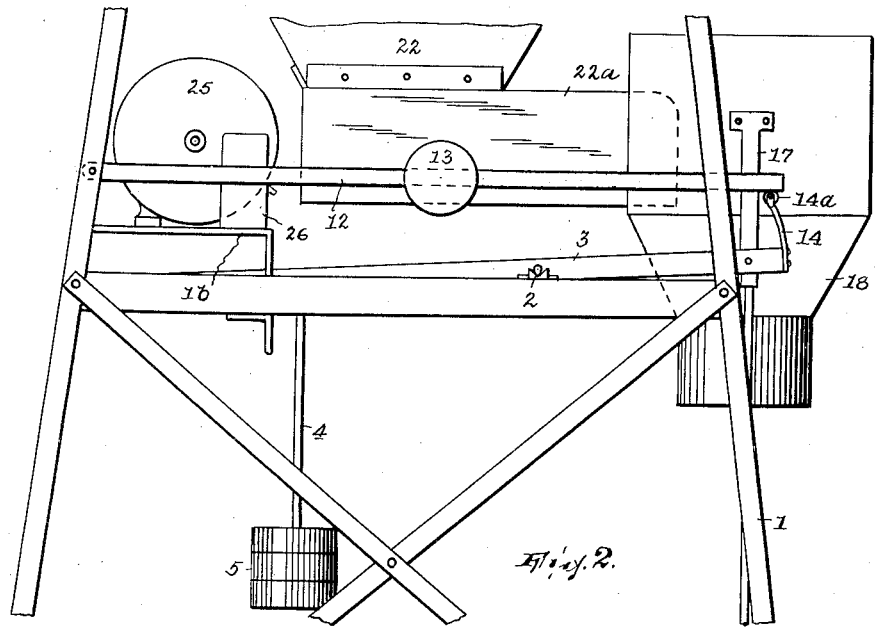
Fig. 2 is a fragmentary left side elevation thereof.
Figure 3:
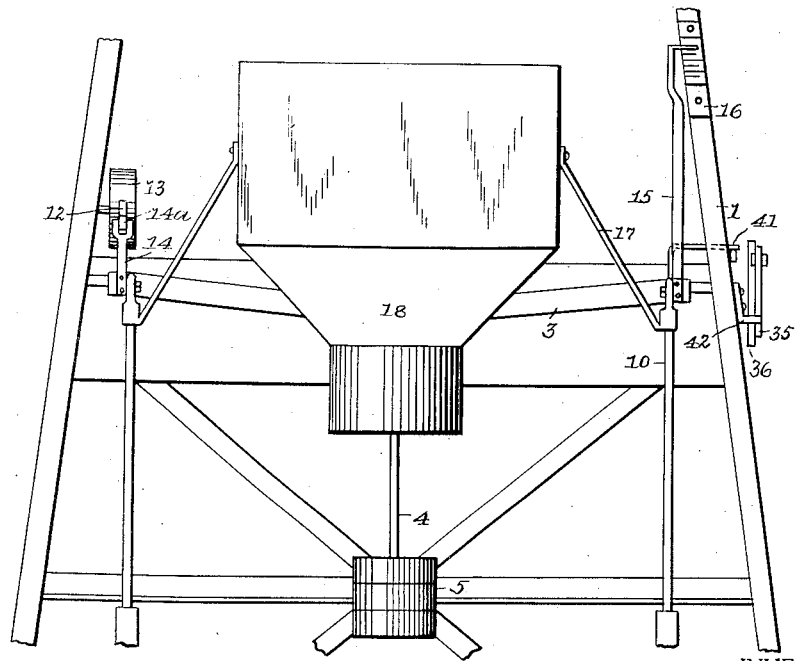
Fig. 3 is a fragmentary front elevation thereof.

In the frame 1 is fulcrumed on knife-bearings 2 a forked lever constituting the main weighing beam 3, the arms of its fork projecting forwardly and its rear arm having a depending carrier 4 for a weight or weights 5. The ends of said arms have knife-bearings 6 on which are hung the shackles 7 and, in each shackle, on a bolt 8, is pivoted the head of a stirrup 10, the stirrups carrying any suitable platform 11 on which the material to be weighed (hereafter termed the load) is deposited, as in a bag or other container. Given the frame, any form of balance therein than that thus described may be regarded as within the invention. And there may be and preferably is in any case a compensating lever 12 pivoted at the rear of the frame and having a shiftable weight 13, the same bearing at its forward end on the roller 14a of a rest 14 upstanding from an arm of the fork of the main beam. On the other arm of such main beam is a pointer 15 to coact with a scale marked on a strip 16 affixed to the frame, such scale consisting of three lines marked in downward succession "Under," "0" and "Over."

The heads of the stirrups 10 have upstanding struts 17 which carry a funnel 18, such therefore being movable with and in effect a part of the balance; the rear wall of this funnel provides an opening, as will appear.

On the frame above the balance is arranged in fixed position a main hopper 19 having depending plates 20, one at each side.

In these plates, on a transverse horizontal axis at 21, is pivoted the movable hopper 22 having a forwardly projecting spout 22a which projects through the mentioned opening in the funnel; the forward part of its bottom is slightly upturned. The movable hopper is normally held by a spring 23 in the position of Fig. 1, or with an edge thereof bearing against a brace 1a of the frame. It is to deliver its contents into the funnel for deposit on the platform and it is to be vibrated around its axis 21 by the following means:

A motor 25, here electric and having a switch 26, is mounted on a shelf 1b of the frame back of the movable hopper. Its armature shaft 27 has an eccentric 28 fixed thereon and in a groove 29 of its housing is reciprocatory a block 30 having a slot 30a receiving the eccentric; the block reciprocates toward and from the movable hopper and has a stud 31 projecting toward the latter, thereby forming what I term the vibrator. The movable hopper is to be moved from its Fig. 1 or retracted position (in which it is normally held by gravity but here also by spring 23) into the range of movement of the vibrator, for which purpose there is the following means:

A spring, or spring coupling, 32 connects the movable hopper with the arm 33a of a lever 33 fulcrumed in bearings at the under side of shelf 1b. The other arm 33b of this lever is connected by a link 34 with the upstanding arm 35a of a hand-lever 35 fulcrumed in and at the front of the frame, the axes of both levers being transverse and horizontal.

To cause dribble-delivery of the contents of the movable hopper the hand-lever is depressed so as to draw the hopper into the range of movement of the vibrator, it being understood that the motor is being already driven and hence the vibrator reciprocated, the counteraction of the vibrator and spring 32 now involving vibration of the hopper. Thus the operator, entirely by manual control, might effect a weighing, i. e., by holding the hand-lever depressed until the balance responded to the load deposited on the balance-platform and pointer 15 assumed some position on its scale, as "0", whereupon on release of the hand-lever spring 23 will return the movable hopper to its normal and hence static position bearing against the brace 1a.

In accordance with my ultimate object, however, releasable detent means is to hold the movable hopper within the range of movement of or so as to be vibrated by the vibrator and when the balance moves on its platform receiving a predetermined load such balance is to cause, automatically, the detent means to release the hopper so that it may assume its normal position, clear of the vibrator. Hence:

A disk 36 is journaled on the frame and has an eccentric stud 37 under which takes the rear arm of the hand-lever, wherefore when the latter is depressed from its Fig. 1 position the disk is turned clockwise. On the disk is another stud 38 which, on such movement of the disk, underlies said arm of the hand-lever to prevent its return (as will appear) after depression thereof to a given position. A toggle-joint is formed by pivotally connected links 39–40 of which link 39 is pivoted to the frame and link 40 pivoted to an eccentric point of the disk, link 40 preferably projecting beyond such point to afford a handle. (The bearing for the disk and all the pivots are transverse and horizontal.) On breaking or buckling the toggle-joint, its convergence is directed downwardly; its straightening movement may be limited by any means, here by parts thereof, as the adjoining ends of its links which, lateral of their connecting pivot, may abut each other when, in the straightening movement, they pass slightly the alined relation to each other. Arranged on the adjacent arm and in effect a part of the main beam is a trip device 41 which overhangs the toggle-joint more or less near its knee or point proper.

The operation for which I term automatic weighing is as follows: The hand-lever is depressed so as to turn the disk clockwise sufficiently to straighten the toggle-joint or establish the detent means formed by the latter and the disk in locking position, depressing the hand-lever having shifted the movable hopper into position to be vibrated by the vibrator; in this state of the parts the disk cannot be turned backward (and hence its stud 38 opposes retraction of the hand-lever) without buckling of the toggle-joint. When the balance responds to the load deposited on its platform the descent of device 41 against the toggle-joint breaks or buckles the latter, wherefore the hand-lever is released and the movable hopper is freed to be returned to its normal or retracted position by spring coupling or spring 32, hence ceasing its maximum discharge. Usually the weighting of the balance (as at 5 and 13) will be so determined that the maximum discharge will be stopped when the pointer 15 coincides with "Under" on its scale. To bring the load to full measure, the operator can dribble or finish off the weighing by holding the hand-lever more or less depressed until the pointer attains "0"; that is to say, depression of the hand-lever short of the limit at which the locking occurs (and also short of the point at which the toggle-joint would prevent descent of the detent and hence continued coaction of the pointer with its scale) is possible so as to continue the delivery to finish the weighing. And even if the operator depressed the hand-lever so far as to effect the locking, he can always cause the release by using handle 40 to break the toggle-joint.

A stop 42 on the frame limits the movement of the hand-lever to retracted position, and in the corresponding or anti-clockwise movement of disk 36 the movement of the latter is limited by a stud 43 on the frame engaging the end of a slot 36a in the disk.

It is not new to employ the balance, when moved by the received load, as means in some way to bring about checking of the delivery to its platform. But any mechanism so operating has been completely automatic, so far as I know; being so it is impossible to obtain an as nicely determined weighing as follows in the use of my machine by which, after the balance causes delivery to cease, the operator can by hand continue the delivery.

Given the two elements formed by hopper 22a and the vibrator, it is immaterial which undergoes movement to and from a position in which the vibrator will vibrate the hopper; whichever element it may be the same is arranged in some movable support which (the support for said element 22a being 22 and for the vibrator being the motor housing) in this instance is the motor housing.

Having thus fully described my invention, what I claim is:

1. In combination, supporting structure, a movable hopper supported thereby, a constantly moving vibrator, said hopper being normally held in a position out of but movable to within the range of movement of the vibrator, and bodily movable elastic yielding means to move the hopper into the range of movement of the vibrator.

2. In combination, a supporting structure, a movable hopper supported thereby, a constantly moving vibrator, said hopper being normally held in a position out of but movable to within the range of movement of the vibrator, and bodily movable elastic yielding means to move the hopper against and thereupon yieldingly hold it against the vibrator.

3. In combination, supporting structure, a movable hopper supported thereby, a continually moving vibrator, said hopper being movable from a position out of to within the range of movement of the vibrator, bodily movable elastic yielding means to move the hopper within said range, and tripable detent means engageable with the first-named means to lock the same against return movement on movement thereof to move the hopper within said range.

4. The combination set forth in claim 3 characterized by said tripable means including a member movable in said structure and a toggle-joint having its links pivoted to said structure and member, respectively, said links having their articulatory range of movement in one direction past alinement with each other limited and less than their such range of movement in the opposite direction past alinement with each other.

5. The combination set forth in claim 3 characterized by said tripable means including a member movable in said structure and a toggle-joint having its links pivoted to said structure and member, respectively, said links having their articulatory range of movement in one direction past alinement with each other limited and less than their such range of movement in the opposite direction past alinement with each other.

6. Mechanism for the purpose described including supporting structure, a member rotative therein, and means to lock said member when rotated in one direction against re-rotation consisting of a toggle-joint having one of its links pivoted to said structure and the other to said member eccentrically thereof, said links having their articulatory range of movement in one direction past alinement with each other limited and less than their such range of movement in the opposite direction past alinement with each other.

7. In combination, with supporting structure and means to be moved back and forth therein including a rotary member having rotatively offset abutment-affording portions, a lever fulcrumed in said structure and engageable with one such portion to rotate said member in one direction and until the lever projects between said portions, and means to lock said member when so rotated against re-rotation consisting of a toggle-joint having one of its links pivoted to said structure and the other to said member eccentrically thereof, said links having their range of articulatory movement in one direction past alinement with each other limited and less than their range of such movement in the opposite direction past alinement with each other.

8. In combination, supporting structure, a movable hopper supported thereby, a constantly moving vibrator, said hopper being movable from a position out of to within the range of movement of the vibrator and reversely, a spring connecting the hopper and structure and opposing movement of the former in the first direction, and bodily movable elastic yielding means to move the hopper in the first direction.

9. In combination, supporting structure, a balance therein having a platform, a constantly moving vibrator, a movable hopper supported by and movable in said structure into the range of movement of the vibrator and arranged on such movement to discharge its contents into the balance platform, tripable detent means to hold the hopper within said range, said means being arranged to be tripped by the balance when the latter moves in response to the load discharged onto its platform by the hopper, and elastic yielding means interconnecting the hopper and tripable means for conjoint movement.

10. In combination, supporting structure, a balance therein having a platform, a constantly moving vibrator, a movable hopper supported by and movable in said structure into the range of movement of the vibrator and arranged on such movement to discharge its contents onto the balance platform, means movable in one direction to move the hopper to within said range and also movable reversely, and tripable means to hold the first-named means on movement in said direction against reverse movement, said tripable means being arranged to be tripped by the balance when the latter moves in response to the load discharged onto its platform by the hopper.

11. In combination, supporting structure, a balance therein having a platform, a constantly moving vibrator, a movable hopper supported by and movable in said structure into the range of movement of the vibrator and arranged on such movement to dischage its contents onto the balance platform, elastic yielding means movable to move the hopper within said range, a member rotative in said structure, and a toggle-joint to hold said means when so moved against retraction, having one of its links pivoted to said structure and the other to said member, and said links having their range of articulatory movement in one direction past alinement with each other limited and less than their range of such movement in the opposite direction past alinement with each other, said toggle-joint being arranged to be buckled by the balance when the latter moves in response to the load discharged onto the balance platform by the hopper.

12. In combination, supporting structure, a balance therein having a platform, a constantly moving vibrator element, a vibratory hopper element, a support for one element movable to and from a position in which the vibrator element will vibrate the hopper element, said hopper element being arranged to discharge the load onto the balance platform, and tripable detent means to hold the support in said position when moved thereto, said detent means being arranged to be tripped by the balance when the latter moves in response to the load so discharged.

13. In combination, supporting structure, a balance therein having a platform, a constantly moving vibrator element, a vibratory hopper element, a support for one element movable to and from a position in which the vibrator element will vibrate the hopper element, said hopper element being arranged to discharge the load onto the balance platform, manually actuated means to move the support into said position, and tripable detent means to hold the support in said position when moved thereto, said detent means being arranged to be tripped by the balance when the latter moves in response to the load so discharged.

EINAR HOLM.